Patented Feb. 6, 1940

2,189,503

UNITED STATES PATENT OFFICE 2,189,503

CONDENSATION PRODUCTS CONTAINING NITROGEN AND PROCESS OF MAKING SAME

Walter Kern, Sissach, Switzerland, assignor to the firm Society of Chemical Industry in Basle, Basel, Switzerland No Drawing. Application October 19, 1937, Serial No. 169,915. In Switzerland October 24, 1936

4 Claims. (Cl. 260—276)

This invention relates to the manufacture of condensation products containing nitrogen by causing a condensing agent to act on a product of the general formula

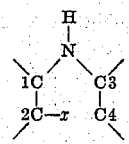

wherein the pair of carbon atoms $C_1C_2$ belong to an anthraquinone nucleus and the pair of carbon atoms $C_3C_4$ belong to a pyrene nucleus and wherein $x$ stands for a carboxyl group in which the hydroxyl may be replaced by a saponifiable residue, in some cases after treatment with a saponifying agent, and if required treating the product thus obtained with an agent having a substituting action or/and a further condensing action.

The products of the above general formula serving as parent materials for the invention can be made, for example, by reaction of negatively substituted anthraquinone carboxylic acids in which at least one negative substituent, for example a halogen, is in ortho-position to the carboxyl group, for example the 1-chloro- or 1-brom-anthraquinone-2-carboxylic acid, with aminopyrenes; another procedure for making the parent materials is by reaction of ortho-amino-anthraquinone carboxylic acids with negatively substituted pyrenes, for example chloro- and bromo-pyrenes. In the anthraquinone carboxylic acids used the hydroxyl of the carboxyl group may be replaced by a saponifiable residue, for example an O-alkyl residue, or halogen, or an amido group; in this case it is advantageous to treat the reaction product with a saponifying agent, for example alcoholic potash, before subjecting it to the action of the condensing agent. The reactions by which the products of the above formula are obtained are conducted in presence of a solvent or diluent, for example amyl alcohol, and advantageously in presence of a catalyst and an agent which binds acid.

The condensing agent which is caused to act on the reaction product of the above formula may for example be an acid condensing agent, such as a halide of an organic acid, sulfuric acid or a halogen-sulfonic acid. These condensing agents may be caused to act on the said reaction products at a raised temperature in the presence of a solvent or diluent. Halides of carboxylic acids, for example acetyl chloride or benzoyl chloride, are particularly suitable condensing agents.

The condensation products obtainable by the invention may be treated with agents having a substituting and/or a further condensing action whereby further valuable products are obtained. As such agents may be named for example: halogens and agents yielding halogen, sulfuric acid, organic mono-carboxylic acid halides, dicarboxylic anhydrides, amines such as aminoanthraquinones and amines of the benzene or naphthalene series, alkylating agents, caustic alkalies and aluminium halides, if required in presence of potassium chloride and sodium chloride.

The new products may be purified by recrystallisation once or more than once from solvents of high boiling point or by conversion into their salts with strong acids or by treatment with oxidizing agents, for example a solution of an alkalihypochlorite. They may be converted according to known methods into their leuco derivatives, for example into leuco-sulfuric acid esters.

The products obtainable by the present invention represent anthraquinonyl-pyrenyl-acridones and correspond to the general formula

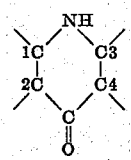

wherein the pair of carbon atoms $C_1C_2$ belongs to an anthraquinone nucleus and the pair of carbon atoms $C_3C_4$ to a pyrene nucleus.

The products obtainable by the invention are valuable in some cases as intermediate products and in other cases as dyestuffs; those of the products useful as dyestuffs may be used for example for dyeing and printing vegetable fibres such as cotton. The yield dyeings and prints which are fast.

The following examples illustrate the invention, the parts being by weight unless otherwise stated and the relationship between parts by weight and parts by volume being that which exists between the kilo and the litre:

Example 1

A mixture of 33.6 parts of 1-chloroanthraquinone-2-carboxylic acid, 52 parts of 3-aminopyrene, 26 parts of dehydrated sodium acetate and 4.2 parts of copper acetate in 700 parts of amyl alcohol is heated to boiling for 1¾ hours in a reflux apparatus and the whole is then filtered hot to remove insoluble matter and impurities. On allowing the filtrate to cool the reaction product separates as a dark crystalline powder which is filtered, washed and dried and then heated with 240 parts of nitrobenzene and 33 parts of acetyl chloride for 2 hours to boiling. The reaction mixture is then cooled to 90° C. and filtered with suction and the solid matter is washed with benzene and alcohol and dried. The dyestuff of the formula

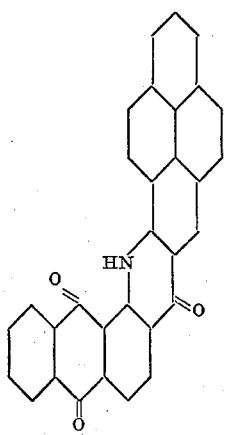

thus obtained in good yield is a green crystalline powder which when recrystallized from α-chloronaphthalene forms green needles of melting point 420–425° C. The product is soluble in concentrated sulfuric acid to a yellow-green solution and dyes cotton very fast green shades in a brown vat.

Example 2

5 parts of the saponified product of the reaction between 1-chloranthraquinone-2-carboxylic acid ethyl ester and 3-aminopyrene are stirred with 7 parts of benzoyl chloride and 60 parts of nitrobenzene for ½ hour at a temperature of 110–120° C. The reaction is then completed by heating the whole to boiling for 1 hour, whereupon the reaction mixture is allowed to cool to 90° C. and the solid matter is filtered, washed and dried. There is thus obtained in a very good yield a dyestuff which melts at 420–425° C. and dyes cotton fast green shades in a brown vat.

Phosphorous pentachloride may be used instead of benzoyl chloride.

The saponified product of the reaction between 1-chloranthraquinone-2-carboxylic acid ethyl ester and 3-aminopyrene used in this example may be prepared as follows:

A mixture of 32.5 parts of 1-chloranthraquinone-2-carboxylic acid ethyl ester, 43.5 parts of 3-aminopyrene, 21 parts of dehydrated sodium acetate and a little copper acetate in 600 parts of amyl alcohol is heated to boiling in a reflux apparatus for about 2 hours. The whole is then cooled to 60° C. and filtered and the solid matter is washed and extracted with boiling hydrochloric acid of 5 per cent. strength. The moist reaction product is suspended in a solution of 150 parts of caustic potash in 3000 parts of alcohol, the suspension is boiled for 2 hours and then diluted with water and acidified with hydrochloric acid and the solid matter is filtered, washed and dried. The product thus obtained in very good yield is a black-green powder which forms, after recrystallization from nitrobenzene, dark prisms of melting point 292–293° C. and soluble in concentrated sulfuric acid to a red brown solution.

The same reaction product is obtained if nitrobenzene is used as solvent or diluent.

Example 3

5 parts of the saponified product of the reaction between 1-chloranthraquinone-2-carboxylic acid ethyl ester and 3-aminopyrene are suspended in 50 parts of α-chloronaphthalene, 7.5 parts of thionyl chloride are added and the whole is maintained for ½ hour at a temperature of 100°C. and then for completing the reaction is stirred for 1 hour longer at 230° C. The whole is then allowed to cool to 100° C. and filtered and the solid matter is washed with benzene and alcohol. The dyestuff is thus obtained in very good yield in the form of a brown-black powder which may be recrystallized from α-chloronaphthalene and melts at 345–355° C. It dyes cotton yellow-olive shades in a red-brown vat.

Example 4

3 parts of the product of the reaction of 1-chloranthraquinone-2-carboxylic acid and 3-aminopyrene are introduced at 20° C. into 35 parts of chloro-sulfonic acid and the whole is stirred at 25–30° C. for 1½ hours. The dyestuff thus formed is precipitated in good yield as a dark powder by the addition of ice. The product has a melting point above 460° C. and is soluble in concentrated sulfuric acid to a brown solution. It dyes cotton yellow-green shades in a red-brown vat.

By replacing the chlorosulfonic acid by sulfuric acid of about 95 per cent. strength and conducting the reaction at 140–150° C. there is obtained a similar dyestuff which dyes cotton shades which are more brown olive.

The product of the reaction of 1-chlor-anthraquinone-2-carboxylic acid and 3-aminopyrene used in this example may be prepared as follows:

A mixture of 5.7 parts of 1-chloranthraquinone-2-carboxylic acid, 6.6 parts of 3-aminopyrene and 5 parts of borax in 60 parts of trichlorobenzene is heated to boiling for 5 hours. After cooling the whole is filtered and the solid matter washed with benzene and alcohol and then extracted with boiling hydrochloric acid of 3 per cent. strength in order to remove inorganic constituents. The condensation product thus obtained in very good yield is washed with water and dried.

The same product is obtained by conducting the reaction in naphthalene with the addition of oxalic acid.

Example 5

9 parts of the dyestuff made as described in Example 1 are suspended in 120 parts of nitrobenzene, some iodine is added and then at 30–40° C. 9 parts of bromine are introduced by drops in the course of ½ hour. The whole is then heated to 55–65° C. and stirred at this temperature for 16 hours. After cooling the mixture is filtered and the solid matter washed with benzene and alcohol and dried. There is obtained in very good yield a dyestuff forming a green crystalline powder of melting point 432–438° C. It dissolves in concentrated sulfuric acid to a green-yellow solution and dyes cotton yellow-green shades in a brown vat.

Example 6

3.4 parts of the dyestuff made as described in Example 5, 5.1 parts of α-aminoanthraquinone, 3 parts of sodium acetate and 2.6 parts of cuprous chloride are suspended in 120 parts of nitrobenzene and the suspension is boiled for 5 hours. It is then filtered hot and the solid matter is washed with chlorobenzene and with alcohol and then extracted with hot dilute hydrochloric acid in order to remove copper compounds. The dyestuff thus obtained in good yield is a black powder of melting point above 460° C. It dissolves in concentrated sulfuric acid to a green solution and dyes cotton brown-olive shades in a red-brown vat.

If 4-benzoylamino-1-aminoanthraquinone is used instead of α-aminoanthraquinone there is obtained a dyestuff which dyes more olive-yellow shades.

Example 7

5.2 parts of tetrabromopyrene, 6 parts of 1-aminoanthraquinone-2-carboxylic acid ethyl ester, 4 parts of dehydrated sodium acetate and 1.8 parts of copper acetate are suspended in 320 parts of nitro-benzene and the suspension is boiled for 8 hours, then cooled and filtered with suction and the solid matter is washed and then extracted with boiling hydrochloric acid of 3 per cent strength. The moist reaction product is then heated with a solution of 45 parts of caustic potash in 1000 parts of alcohol for 2 hours to boiling. The reaction mixture is then diluted with water, acidified and filtered and the solid matter is washed, dried and then heated with 60 parts of nitrobenzene and 9.9 parts of acetyl chloride for 2 hours to boiling. The reaction mixture is then allowed to cool to 90° C. and the dyestuff is separated by filtering. It is an olive-brown powder of melting point 370–375° C. It is soluble in concentrated sulfuric acid to a brown solution and dyes cotton yellow-olive shades in a brown vat.

Example 8

22.5 parts of the dyestuff made as described in Example 2, are introduced at ordinary temperature into 400 parts of nitric acid of specific gravity 1.4. The mixture is then heated to 110–120° C. and stirred for 2 hours longer. After cooling and dilution with water the mixture is filtered and the reaction product thus separated in very good yield is obtained in the form of a red powder whose melting point is above 460° C. It is soluble in concentrated sulfuric acid to an orange-brown solution and dyes cotton brown shades in a brown vat.

If the dyestuff made as described in Example 2 is stirred with fuming nitric acid at ordinary temperature a dyestuff is obtained which dyes cotton grey-black shades.

Example 9

22.5 parts of the dyestuff made as described in Example 2 are suspended in 600 parts of nitrobenzene and there is added by drops at ordinary temperature a solution of 5 parts of fuming nitric acid in 120 parts of nitrobenzene. The mass is stirred at 20° C. for 2 hours longer and then heated to 90–100° C. After stirring for 16 hours at the last named temperature the reaction is finished and the dyestuff which has separated in the form of fine brown needles can be isolated by cooling and filtering. It decomposes at 380–390° C. and dissolves in concentrated sulfuric acid to a brown-green solution. It dyes cotton brown shades in a brown vat.

A similar dyestuff is obtained by stirring the dyestuff obtained as described in Example 2 with an excess of fuming nitric acid in nitrobenzene at 20° C.

Example 10

500 parts of aluminium chloride, 100 parts of potassium chloride and 70 parts of sodium chloride are melted together at 112–115° C. and 22.5 parts of the dyestuff made as described in Example 1 are then added in portions to the melt. For completing the reaction the whole is stirred for 5½ hours at 120–125° C. After cooling the reaction product is comminuted, introduced into dilute hydrochloric acid, boiled and filtered and the solid matter is dried and recrystallized from α-chloronaphthalene. The dyestuff thus obtained is a dark green powder of melting point above 460° C. and soluble in concentrated sulfuric acid to a green-yellow solution. It dyes cotton very fast olive shades in a black-brown vat.

Example 11

A mixture of 45 parts of phthalic anhydride and 22.5 parts of the dyestuff made as described in Example 1 is introduced at 112–115° C. in the course of ½ hour into a melt of 500 parts of aluminium chloride, 100 parts of potassium chloride and 70 parts of sodium chloride whilst stirring. The whole is then heated to 125–130° C. and maintained at this temperature for 8 hours. After cooling the reaction mass is comminuted, introduced into dilute hydrochloric acid and boiled and the solid matter is separated by filtering and washed. The crude dyestuff thus obtained is purified by treatment with a hot dilute solution of sodium carbonate followed by extraction with boiling alcohol. It is a black powder which decomposes at 360–370° C. and imparts a green color to concentrated sulfuric acid. It dyes cotton powerful, very fast olive shades in a red-brown vat.

If the temperature of the melt is kept at 150–155° C. for 6 hours there is obtained a dyestuff of melting point above 460° C. which is soluble in concentrated sulfuric acid to a yellow-green solution and dyes cotton very fast blackish-brown shades in a red-brown vat.

Example 12

500 parts of aluminium chloride, 100 parts of potassium chloride and 70 parts of sodium chloride are melted together at 112–117° C. and there is introduced into the melt in portions a mixture of 22.5 parts of the dyestuff made as described in Example 1 and 20 parts of benzoyl chloride. In order to complete the reaction the temperature is raised to 150–160° C. and is maintained at this temperature for 2 hours whilst simultaneously air is introduced. After cooling the reaction product is comminuted and introduced into dilute hydrochloric acid; the whole is boiled and filtered and the residue is extracted with boiling water. For purification the crude dyestuff is extracted with a dilute solution of sodium carbonate and then with alcohol. It is a black-brown powder which melts above 460° C. and is soluble in concentrated sulfuric acid to a green solution. It dyes cotton very fast yellowish-brown shades in a violet vat.

If the temperature of the melt is kept for 5 hours at only 120–125° C. a dyestuff is obtained which is soluble in concentrated sulfuric acid to a brown-violet solution and dyes cotton very fast yellow-olive shades in a red-brown vat.

Example 13

13 parts of sulfuryl chloride are added drop by drop in the course of 30 minutes at 50–55° C. to a suspension of 45 parts of the dyestuff made as described in Example 1 in 600 parts of nitrobenzene. The whole is then heated to 60–65° C. and stirred for 16 hours at this temperature. After cooling the whole is filtered and the solid matter is washed and dried. The dyestuff thus obtained is a green-black powder which decomposes at 355–365° C. and is soluble in concentrated sulfuric acid to a green-yellow solution. It dyes cotton fast olive shades in a brown vat.

Example 14

56 parts of sulfuryl chloride are added drop by drop in the course of 30 minutes at 50–55° C. to a suspension of 45 parts of the dyestuff made as described in Example 1 in 600 parts of nitrobenzene. The whole is then heated to 60–65° C. and stirred at this temperature for 16 hours. After cooling the whole is filtered and the solid matter is washed and dried. The dyestuff thus obtained is a red-brown crystalline powder which decomposes at 410° C. and is soluble in concentrated sulfuric acid to a brown-yellow solution. It dyes cotton olive shades in a brown vat.

Example 15

26 parts of the chlorination product made as described in Example 14, 52 parts of α-aminoanthraquinone, 30 parts of dehydrated sodium acetate and 26 parts of cuprous chloride are suspended in 1200 parts of nitrobenzene and the suspension is boiled for 5 hours, then cooled to 100° C. and filtered. The solid matter is washed with benzene and alcohol, treated with dilute hydrochloric acid to remove copper compounds and finally extracted with boiling alcohol. The dyestuff is an olive-black powder which melts at 370–380° C. and is soluble in concentrated sulfuric acid to a brown-green solution. It dyes cotton very fast brown-olive shades in a red-brown vat.

Example 16

15 parts of the chlorination product made as described in Example 13, 23 parts of para-phenetidine, 23 parts of dehydrated sodium acetate and 11 parts of cuprous chloride are suspended in 420 parts of nitro-benzene and the suspension is boiled for 5 hours, then cooled to 100° C. and filtered. The solid matter is washed with benzene and alcohol, treated with hot dilute hydrochloric acid to remove copper compounds and is finally extracted with boiling alcohol. The dyestuff is a green-black powder which melts above 460° C. and is soluble in concentrated sulfuric acid to a green-yellow solution. It dyes cotton very fast yellowish-green shades in a red-brown vat.

Example 17

A mixture of 6.3 parts of 1-chloranthraquinone-2-carboxylic acid ethyl ester, 8 parts of amino-3-benzoylaminopyrene, 4.2 parts of dehydrated sodium acetate and some copper acetate in 120 parts of amyl alcohol is heated to boiling for 3½ hours, then cooled to 70° C. and filtered. The solid matter is washed, extracted with boiling hydrochloric acid of 3 per cent strength, again filtered, washed and then saponified with alcoholic potash. After acidification, filtering, washing and drying there is obtained a black reaction product which is soluble in concentrated sulfuric acid to a red-brown solution. This reaction product is heated with 50 parts of nitrobenzene and 7.2 parts of benzoyl chloride first for ½ hour at 110–120° C. and then whilst stirring for a further hour at 200–220° C. The reaction mixture is cooled to 90° C. and filtered and the solid matter is washed and dried. The dyestuff is a green powder which decomposes at 368° C. and is soluble in concentrated sulfuric acid to a green-yellow solution. It dyes cotton bright yellow-green shades in a brown vat.

The amino-3-benzoylaminopyrene used in this example is obtainable in the following manner:

38.4 parts of 3-benzoylaminopyrene, prepared by benzoylation of 3-aminopyrene, are suspended in 480 parts of nitrobenzene and in the course of ½ hour a solution of 9 parts of nitric acid of 96 per cent strength in 48 parts of nitrobenzene is dropped into the suspension. The whole is then heated to 85–90° C. and stirred for 3 hours at this temperature. After cooling the reaction mixture is filtered and the solid matter is washed and then reduced by means of sodium sulfide in a heated alcoholic suspension. After the reduction the reaction mixture is cooled to 30° C., whereupon the amino-3-benzoylaminopyrene separates in the form of pale yellow needles of melting point 243–246° C. and can be isolated by filtration.

Example 18

4.5 parts of the dyestuff made as described in Example 1 are introduced at 20° C. into 180 parts of sulfuric acid of 98 per cent strength and the yellow-green solution thus formed is then stirred for 20 hours at this temperature. The reaction mixture is then poured on to ice and the solid matter separated by filtering, washed and dried. There is thus obtained in a good yield a dyestuff which is soluble in dilute sodium carbonate solution and can be reprecipitated from this solution by addition of an acid. It dyes cotton yellowish-olive shades in a brown-red vat.

Example 19

2.5 parts of the dyestuff made as described in Example 18 are introduced into a mixture of 12 parts of caustic potash and 7.5 parts of alcohol. The alcohol is evaporated and the residue heated to 230° C. and maintained for ½ hour at a temperature of 228–236° C. whilst stirring. The melt is cooled, stirred with water and filtered, and the solid matter is washed and dried. The portion which is insoluble in alkali is stirred with 18 parts of α-chloronaphthalene, 1 part of sodium carbonate and 1 part of para-toluene-sulfonic acid methyl ester for 3 hours at 190–200° C. After cooling and filtering the solid matter is washed and dried. The dyestuff so obtained is a black-brown powder which decomposes at 375–385° C. and is soluble in concentrated sulfuric acid to an orange-brown solution. It dyes cotton fast olive shades in a brown vat.

The alkaline filtrate obtained after stirring the cooled melt with water and filtering is acidified and filtered, and the solid matter is washed, dried and then stirred with 18 parts of α-chloronaphthalene, 1 part of sodium carbonate and 1 part of para-toluene-sulfonic acid methyl ester for 3 hours at 190–200° C. By cooling, filtering and washing the solid matter a dyestuff is obtained as a brown-black powder which decomposes at 330–335° C., and is soluble in concentrated sulfuric acid to an orange-brown solution. It dyes cotton fast yellowish-olive shades in a brown vat.

*Example 20*

A mixture of 5.9 parts of 1-chloranthraquinone-2-carboxylic acid ethyl ester, 4.6 parts of amino-3-methoxypyrene, 4.2 parts of dehydrated sodium acetate and 0.7 part of copper acetate in 104 parts of amyl alcohol is heated to boiling for 3 hours, then cooled and filtered. The solid matter is washed and the residue is extracted with boiling hydrochloric acid of 2 per cent. strength, again filtered and washed, and then saponified by boiling with alcoholic potash of 3 per cent. strength for 1½ hours. There is obtained a dark colored reaction product melting at 220° C. and soluble in concentrated sulfuric acid to a brown solution. This product is heated with 91 parts of nitrobenzene and 12 parts of acetyl chloride first for ½ hour at 110–120° C. and then for 1 hour at 200–210° C., after which the whole is cooled to 90° C. and filtered and the solid matter is washed with benzene and alcohol and dried. The dyestuff thus obtained may be purified by recrystallization from α-chloronaphthalene, whereby it is obtained as a green crystalline powder of melting point 338–342° C. and soluble in concentrated sulfuric acid to a bright orange-red solution. It dyes cotton brilliant pure yellow-green shades in a brown vat.

The amino-3-methoxypyrene used in this example is obtainable in the following manner:

23.2 parts of 3-methoxypyrene, prepared by methylation of 3-hydroxypyrene, are suspended in 300 parts of glacial acetic acid and at 50–60° C. 10 parts of nitric acid of 68 per cent. strength are allowed to drop into the suspension in the course of ¾ hour whilst vigorously stirring. The temperature is then raised to 80–85° C. and stirring is continued for 6 hours longer at this temperature, after which the reaction mixture is cooled to 60° C. and filtered. The solid matter is washed and the yellow nitro-body melting at 160° C. thus obtained is reduced by heating with alcoholic sodium sulfide. After reduction the whole is cooled and diluted with water, whereby the amino-3-methoxypyrene separates as an oil which, however, soon solidifies to a crystalline mass. The amino-3-methoxypyrene is obtained in the form of sulfur-yellow crystals of melting point 125° C. by recrystallization from benzine.

*Example 21*

12 parts of amino-3-ethoxypyrene hydrochloride are suspended in 200 parts of amyl alcohol and stirred for ¼ hour at 50° C. with 5 parts of dehydrated sodium acetate. 12.6 parts of 1-chloranthraquinone-2-carboxylic acid ethyl ester, 8 parts of dehydrated sodium acetate and 1.5 parts of copper acetate are added, the temperature is raised to 140–150° C. and the whole kept at this temperature for 3 hours. After cooling the reaction mixture is filtered and the solid matter is washed with alcohol, then extracted with hydrochloric acid of 1 per cent. strength again filtered, washed and saponified by heating to the boil for 1½ hours with alcoholic potash of 1.5 per cent. strength. There is thus obtained a green-olive reaction product which is soluble in concentrated sulfuric acid to a brown solution. The reaction product is heated with 192 parts of nitrobenzene and 26.4 parts of acetyl chloride first for ½ hour at 110–120° C. and then for 1 hour at 200–210° C. The reaction mixture is cooled to 90° C. and filtered and the solid matter is washed with benzene and alcohol, and dried. The dyestuff which can be recrystallized from α-chloronaphthalene is obtained in good yield in the form of green needles which are soluble in concentrated sulfuric acid to an orange-brown solution, have a decomposition point of 315° C., and dye cotton fast yellow-green, pure shades in a brown vat. If in this example the amino-3-ethoxypyrene hydrochloride is replaced by amino-3-methoxyethoxypyrene hydrochloride or by amino-3-n-butoxypyrene hydrochloride or by amino-3-isopropoxypyrene hydrochloride, similar dyeing dyestuffs are obtained.

The amino-3-ethoxypyrene hydrochloride used in this example has been prepared in the following manner:

21.6 parts of 3-ethoxypyrene, obtained by ethylation of 3-oxypyrene with diethyl sulfate, are dissolved in 400 parts of glacial acetic acid and into this solution there are added by drops in the course of one hour at 20–30° C. 8.6 parts of nitric acid of 68 per cent. strength. Stirring is continued for 2 hours at 20–30° C. and the temperature is gradually raised by maintaining the mixture first for 2 hours at 40–50° C. and finally for 8 hours at 80–85° C. After filtering and washing with alcohol the nitro product melting at 165–169° is reduced with tin shavings and hydrochloric acid. By filtration there is obtained the amino-3-ethoxypyrene hydrochloride from which the free base can be liberated with dilute ammonia. For the purpose of purification the base is dissolved in benzene, filtered from little impurities and after drying the benzene solution there is introduced hydrochloric acid gas, whereby the amino-3-ethoxypyrene hydrochloride precipitates which after recrystallization from alcohol and hydrochloric acid is obtained in colorless needles which decompose at 262–266° C. The amino-3-methoxy-ethoxypyrene hydrochloride, the amino-3-n-butoxypyrene hydrochloride and the amino-3-isopropoxypyrene hydrochloride are obtained in analogous manner like the amino-3-ethoxypyrene hydrochloride by using as alkylating agent the para-toluol sulfonic acid ester of the glycol-mono-methyl-ether or n-butylhalide or isopropylhalide, and nitrating and reducing the alkoxy compounds thus obtained.

*Example 22*

7.2 parts of amino-3-benzoylpyrene hydrochloride are suspended in 100 parts of amyl alcohol and kept for ¼ hour at 50° C. with 2.5 parts of dehydrated sodium acetate. 6.3 parts of 1-chloranthraquinone-2-carboxylic acid ethyl ester, 4 parts of dehydrated sodium acetate and 0.8 part of copper acetate are added, the temperature is raised to 140–150° C. and the whole is stirred for 3 hours at this temperature. After cooling the reaction mixture is filtered and the solid matter washed with alcohol and saponified with dilute alcoholic potash. There is thus obtained a brown colored reaction product which is soluble in concentrated sulfuric acid to a raspberry red solution and which, when heated with 108 parts of nitrobenzene and 13 parts of acetyl chloride, passes into a dyestuff which is filtered at 90° C. and recrystallized from α-chlornaphthalene. There are thus obtained olive colored needles which are soluble in concentrated sulfuric acid to a red violet solution and dye cotton from a brown vat green, very fast shades.

The amino-3-benzoylpyrene hydrochloride has been prepared in the following manner:

12.2 parts of 3-benzoylpyrene, obtained by the reaction of pyrene with benzoyl chloride, are dissolved in 300 parts of glacial acetic acid, and into this solution there are allowed to drop in at 20–30° C. and in the course of one hour 4 parts of nitric acid of 68 per cent. strength. In order to complete the reaction, the mixture is stirred for 3 hours at 20° C., then for 4 hours at 40–50° C., and finally for 8 hours at 80–85° C., whereupon it is filtered and washed with alcohol. The nitro-3-benzoylpyrene forms yellow needles of melting point 152–155° C. which are soluble in concentrated sulfuric acid to a raspberry red solution and are reduced with sodium sulfide in alcoholic suspension. For purification the crude amino-3-benzoylpyrene is converted into the hydrochloride, a decomposition point of 208° C. being obtained thereby.

*Example 23*

9.6 parts of monochloro-3-aminopyrene hydrochloride, produced by chlorinating and reducing 3-nitropyrene, are suspended in 160 parts of amyl alcohol and kept for ¼ hour at 50° C. with 4 parts of dehydrated sodium acetate. 10.5 parts of 1-chloranthraquinone-2-carboxylic acid ethyl ester, 6.5 parts of dehydrated sodium acetate and 1.2 parts of copper acetate are added, the temperature is raised to 140–150° C. and the whole is stirred for 3 hours at this temperature. After cooling the reaction mixture is filtered and the solid matter washed with alcohol and water, extracted with hydrochloric acid of 1 per cent. strength and saponified with alcoholic potash. There is thus obtained a brown colored reaction product which is soluble in concentrated sulfuric acid to a red-brown solution and which, when heated with 130 parts of nitrobenzene and 18 parts of acetylchloride, passes into the dyestuff. After cooling to 90° C. the dyestuff is filtered, washed and recrystallized from α-chloronaphthalene, whereby a dark green powder of melting point 380–387° C. is obtained which is soluble in concentrated sulfuric acid to a green solution and dyes cotton from a brown vat olive shades which are very fast.

A similar dyestuff but capable of being vatted with more difficulty is obtained by using instead of monochloro-3-aminopyrene hydrochloride, trichloro-3-aminopyrene hydrochloride which is obtained by chlorinating nitropyrene and reducing.

*Example 24*

1.1 parts of the dystuff obtained in Example 23, second paragraph, are stirred for 5 hours at 200–205° C. with 2.2 parts of 1-aminoanthraquinone, 1.5 parts of dehydrated sodium acetate, 1.1 parts of cuprous chloride and 48 parts of nitrobenzene. After cooling to 100° C. the whole is filtered, washed and extracted with dilute hydrochloric acid. The dyestuff forms an olive-black powder which is soluble in concentrated sulfuric acid to an olive-black solution and dyes cotton very fast brown-olive shades in a red-brown vat.

Similar products are obtained if the dyestuff obtained in Example 23, paragraph 1, is caused to react with 1-amino-anthraquinone or para-phenetidine.

*Example 25*

24 parts of the dyestuff obtained in Example 20 are suspended in 360 parts of nitrobenzene and 50–55° C. 9 parts of sulfuryl chloride are added in drops. In order to complete the reaction stirring is continued for 16 hours at 60–65° C., and the reaction mixture is then filtered, washed and dried. The dyestuff thus obtained is recrystallized from α-chlornaphthalene, whereby a green crystalline powder is obtained which decomposes at 344–348° C., dyes concentrated sulfuric acid orange-brown and cotton yellow-green shades in a brown vat.

If sulfuryl chloride is used in excess, there is obtained a brown-red colored dyestuff which melts above 460° C. and is soluble in concentrated sulfuric acid to a brown solution. It can be caused to react with 1-amino-anthraquinone, whereby a brown dyestuff is formed which dyes cotton powerful olive-brown fast shades in a brown vat.

*Example 26*

24 parts of the dyestuffs obtained in Example 20 are suspended in 600 parts of nitrobenzene and a solution of 10 parts of bromine in 60 parts of nitrobenzene is allowed to drop into the suspension in the course of 1 hour. In order to complete the reaction the whole is stirred for 2 hours at 50–55° C. and then for 16 hours at 60–65° C. The dyestuff which separates in the form of a thick magma is filtered, washed, dried and recrystallized from α-chloronaphthalene. There is thus obtained a green crystalline powder which is soluble in concentrated sulfuric acid to an orange-brown solution, decomposes at 315–319° C., and dyes cotton yellow-green fast shades in a brown vat. The dyeing are considerably yellower than those of the unbrominated dyestuff.

What I claim is:

1. Condensation products containing nitrogen of the general formula

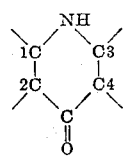

wherein the pair of carbon atoms $C_1C_2$ belongs to an anthraquinone nucleus and the pair of carbon atoms $C_3C_4$ belongs to a pyrene nucleus, and wherein the NH-group connects an α-position of the anthraquinone nucleus with the 3-position of the pyrene.

2. Condensation products containing nitrogen of the general formula

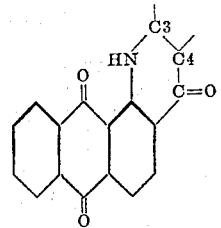

wherein the pair of carbon atoms $C_3C_4$ belongs to a pyrene nucleus, and wherein the NH-group connects an α-position of the anthraquinone nucleus with the 3-position of the pyrene.

3. Condensation products containing nitrogen of the general formula
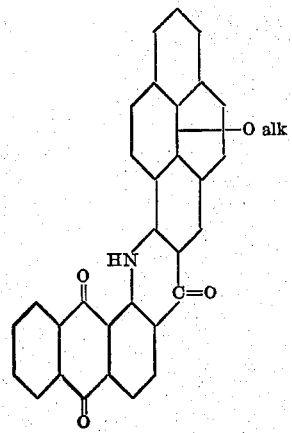
4. Condensation products containing nitrogen of the general formula
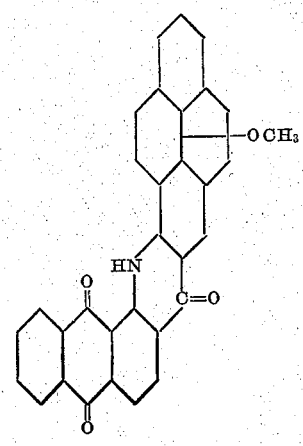
WALTER KERN.